(12) United States Patent  
Cho

(10) Patent No.: US 11,004,613 B2
(45) Date of Patent: May 11, 2021

(54) MULTILAYER CAPACITOR

(71) Applicant: SAMSUNG ELECTRO-MECHANICS CO., LTD., Suwon-si (KR)

(72) Inventor: Beom Joon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/190,919

(22) Filed: Nov. 14, 2018

(65) Prior Publication Data
US 2020/0058448 A1 Feb. 20, 2020

(30) Foreign Application Priority Data

Aug. 16, 2018 (KR) .................. 10-2018-0095233

(51) Int. Cl.
H01G 4/38 (2006.01)
H01G 4/30 (2006.01)
(Continued)

(52) U.S. Cl.
CPC ............... H01G 4/38 (2013.01); H01G 4/224 (2013.01); H01G 4/248 (2013.01); H01G 4/30 (2013.01);
(Continued)

(58) Field of Classification Search
CPC .......... H01G 4/38; H01G 4/228; H01G 4/232; H01G 4/248; H01G 4/30; H01G 4/1227
(Continued)

(56) References Cited

U.S. PATENT DOCUMENTS 6,191,933 B1 * 2/2001 Ishigaki ................. H01G 4/232
361/309
7,331,799 B1 2/2008 Lee
(Continued)

FOREIGN PATENT DOCUMENTS

CN 100440393 C 12/2008
CN 102683021 A 9/2012
(Continued)

OTHER PUBLICATIONS

Office Action issued in corresponding Japanese Application No. 2018-215932, dated Jul. 2, 2019.
(Continued)

Primary Examiner — Arun Ramaswamy
(74) Attorney, Agent, or Firm — Morgan, Lewis & Bockius LLP

(57) ABSTRACT

An electronic component includes: a capacitor array including a plurality of multilayer capacitors consecutively disposed in a horizontal direction, first and second metal frames disposed on both side surfaces of the capacitor array and connected to first and second external electrodes, respectively. The first and second metal frames respectively include first and second horizontal bonding portions bonded to upper portions of first and second band portions, first and second horizontal mounting portions disposed to oppose the first and second horizontal bonding portions in a vertical direction, and first and second vertical portions connecting the first and second horizontal bonding portions and the first and second horizontal mounting portions and having at least one first and second cutout portions in a horizontal direction, respectively. The first and second horizontal mounting portions are spaced apart from the plurality of multilayer capacitors.

19 Claims, 14 Drawing Sheets

(51) Int. Cl.
*H01G 4/224* (2006.01)
*H01G 4/248* (2006.01)
*H01G 4/12* (2006.01)

(52) U.S. Cl.
CPC ......... *H01G 4/1227* (2013.01); *H01G 4/1245* (2013.01)

(58) Field of Classification Search
USPC ... 361/306.3, 328, 541, 306.1, 306.2, 308.1, 361/301.4, 321.1, 321.2, 321.3
See application file for complete search history.

(56) References Cited

U.S. PATENT DOCUMENTS

| | | | |
|---|---|---|---|
| 8,988,857 B2 | 3/2015 | McConnell et al. | |
| 9,613,753 B2 | 4/2017 | Maeda et al. | |
| 9,947,459 B2 | 4/2018 | Park et al. | |
| 2004/0183147 A1 | 9/2004 | Togashi et al. | |
| 2012/0236462 A1 | 9/2012 | Haruki et al. | |
| 2013/0146347 A1* | 6/2013 | McConnell | H01G 2/06 174/260 |
| 2015/0187495 A1* | 7/2015 | Maeda | H01G 4/30 361/303 |
| 2015/0296623 A1 | 10/2015 | Trinh | |
| 2016/0071650 A1 | 3/2016 | McConnell et al. | |
| 2016/0211075 A1 | 7/2016 | Park | |
| 2016/0219739 A1 | 7/2016 | Park et al. | |
| 2017/0025223 A1 | 1/2017 | Bultitude et al. | |
| 2017/0127520 A1 | 5/2017 | Park et al. | |

FOREIGN PATENT DOCUMENTS

| | | |
|---|---|---|
| CN | 103999176 A | 8/2014 |
| CN | 104752055 A | 7/2015 |
| CN | 108281283 A | 7/2018 |
| EP | 3929087 A2 | 7/1999 |
| EP | 2471079 B1 | 7/2012 |
| JP | 07-249541 A | 9/1995 |
| JP | 8-17679 A | 1/1996 |
| JP | 11-251186 A | 9/1999 |
| JP | 2003-17367 A | 1/2003 |
| JP | 2004-273935 A | 9/2004 |
| JP | 2004-288847 A | 10/2004 |
| JP | 2012-044112 A | 3/2012 |
| JP | 2016-139787 A | 8/2016 |
| JP | 2016-143882 A | 8/2016 |
| KR | 10-2016-0092251 A | 8/2016 |
| KR | 10-1740818 B1 | 5/2017 |
| WO | 2011/005378 A1 | 1/2011 |

OTHER PUBLICATIONS

Notice of Office Action dated Nov. 21, 2019 in Korean Patent Application No. 10-2018-0095233 (With English Translation).
Notice of Office Action dated Dec. 10, 2019 in Japanese Patent Application No. 2018-215932 (With English Translation).
First Office Action issued in Chinese Patent Application No. 201910102528.2 dated Mar. 16, 2021 (English translation).

\* cited by examiner

MULTILAYER CAPACITOR

CROSS-REFERENCE TO RELATED APPLICATION(S)

This application claims the benefit of priority to Korean Patent Application No. 10-2018-0095233 filed on Aug. 16, 2018 in the Korean Intellectual Property Office, the disclosure of which is incorporated herein by reference in its entirety.

TECHNICAL FIELD

The present disclosure relates to an electronic component.

BACKGROUND

A multilayer capacitor has been used in a variety of electronic devices, as it is relatively small in size and is able to implement high capacitance.

Recently, as consumption of eco-friendly vehicles and electronic vehicles has increased, the number of power driving systems provided in vehicles has increased, and there has been increased demand for multilayer capacitors for use in vehicles.

A multilayer capacitor may be required to have a high level of thermal reliability, electronic reliability, and mechanical reliability to be used as a component of a vehicle, and thus, a level of performance required in a multilayer capacitor has been more advanced than before.

Particularly, it has been required to develop an electronic component capable of implementing high capacitance by stacking a plurality of multilayer capacitors in a limited space or an electronic component having enhanced durability against vibrations and deformation.

SUMMARY

An aspect of the present disclosure is to provide a stacked type electronic component capable of implementing high capacitance and having excellent durability and reliability against vibrations and deformation.

According to an aspect of the present disclosure, an electronic component includes a capacitor array including a plurality of multilayer capacitors consecutively disposed in a horizontal direction, a first metal frame disposed on one side surface of the capacitor array and connected to a first external electrode of each of the plurality of multilayer capacitors, and a second metal frame disposed on the other side surface of the capacitor array and connected to a second external electrode of each of the plurality of multilayer capacitors. The first metal frame includes a first horizontal bonding portion bonded to an upper portion of the plurality of the first external electrodes, a first horizontal mounting portion disposed to oppose the first horizontal bonding portion in a vertical direction, and a first vertical portion connecting the first horizontal bonding portion and the first horizontal mounting portion and having at least one first cutout portion in the horizontal direction. The second metal frame includes a second horizontal bonding portion bonded to an upper portion of the plurality of the second external electrodes, a second horizontal mounting portion disposed to oppose the second horizontal bonding portion in the vertical direction, and a second vertical portion connecting the second horizontal bonding portion and the second horizontal mounting portion and having at least one second cutout portion in the horizontal direction. The first and second horizontal mounting portions may be spaced apart from the multilayer capacitor.

The first and second horizontal mounting portions of the first and second metal frames may respectively have at least one third cutout portion and at least one fourth cutout portion in a direction parallel to the first and second horizontal mounting portions, respectively.

A conductive adhesive portion may be disposed between the first external electrode and the first horizontal bonding portion and between the first external electrode and the first vertical portion. A conductive adhesive portion may be disposed between the second external electrode and the second horizontal bonding portion and between the second external electrode and the second vertical portion.

The electronic component may further include an encapsulation portion encapsulating the capacitor array, and the first and second horizontal mounting portions may be externally exposed from the encapsulation portion.

The multilayer capacitor may include a body and the first and second external electrodes disposed on both ends of the body, and the body may include a dielectric layer and first and second internal electrodes alternately disposed in a width direction with the dielectric layer interposed therebetween.

The first and second external electrodes may respectively include the first and second head portions disposed on both end surfaces of the body, and the first and second band portions extending in the length direction from the first and second head portions to portions of upper and lower surfaces of the body.

The first vertical portion may be positioned in a central portion of each of the first head portions in the horizontal direction, and the second vertical portion may be positioned in a central portion of each of the second head portions in the horizontal direction.

$0.2 \leq Am/At \leq 0.9$ is satisfied, where an area of the first or second head portion of the first or second external electrode is defined as "At", and an area of the first or second vertical portion is defined as "Am".

The capacitor array may include a plurality of capacitor arrays stacked in two or more layers in the vertical direction.

The first and second external electrodes respectively include first and second head portions disposed on both end surfaces of the body in a length direction of each multilayer capacitor, which is orthogonal to the horizontal and vertical direction.

The first vertical portion may extend up to the first head portion of the capacitor array disposed in an upper layer of the two or more layers, and the second vertical portion may extend up to the second head portion of the capacitor array disposed in the upper layer of the two or more layers.

In the capacitor array disposed in the upper layer, a conductive adhesive portion may be disposed between the first head portion and the first vertical portion, and between the second head portion and the second vertical portion.

The electronic component may further include the encapsulation portion encapsulating a plurality of the capacitor arrays, and the first and second horizontal mounting portions may be externally exposed from the encapsulation portion.

The capacitor array may have multiple layers and multiple columns.

According to another aspect of the present disclosure, an electronic component may include a capacitor array including a plurality of multilayer capacitors which are sequentially arranged in a first direction; wherein each of the plurality of multilayer capacitors comprises: a body, and first and second external electrodes respectively disposed on opposing surfaces of the body in a length direction of the body, which is orthogonal to the first direction; and a pair of metal frames disposed on both side surfaces of the capacitor array and respectively connected to the first and second external electrodes of each of the plurality of multilayer capacitors. The pair of metal frames includes first and second vertical portions respectively bonded to the first and second external electrodes; first and second horizontal bonding portions respectively extending in the length direction from upper ends of the first and second vertical portions; and first and second horizontal mounting portions respectively extending in the length direction from lower ends of the first and second vertical portions and spaced apart from the capacitor array. The first and second vertical portions and the first and second horizontal mounting portions each include at least one cutout portion in the horizontal direction, such that the first and second vertical portions and the first and second horizontal mounting portions are divided into multiple pieces having a predetermined gap therebetween.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
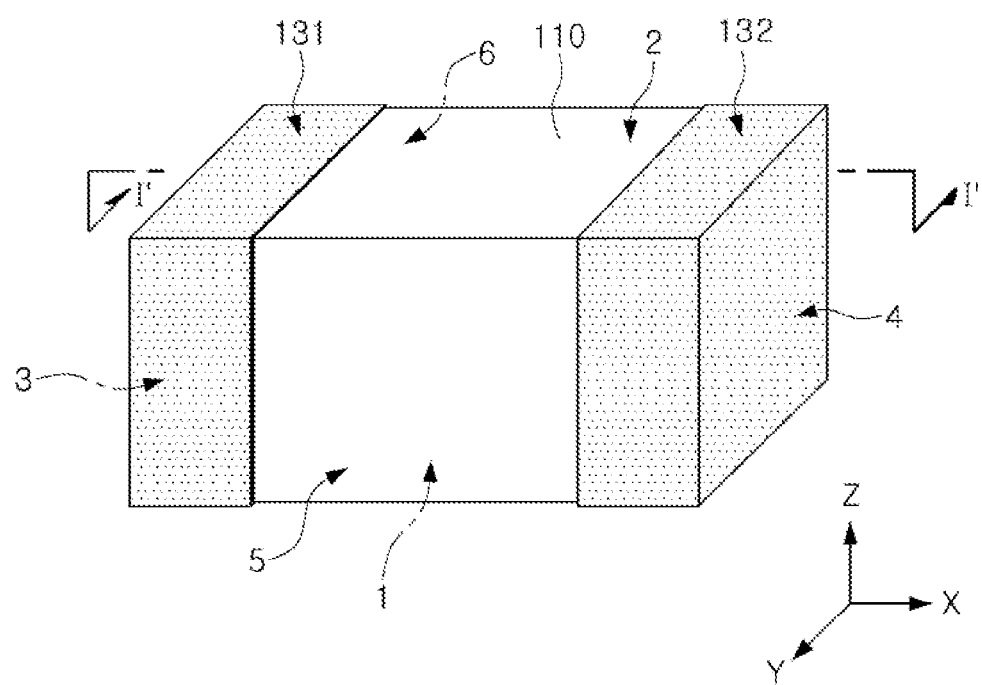
FIG. 1 is a perspective diagram illustrating a multilayer capacitor according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of the elements in the drawings can be exaggerated for clarity of description, and elements indicated by the same reference numerals may be the same components.

The same elements having the same function within the scope of the same concept will be described with use of the same reference numerals.

Further, throughout the specification, it will be understood that when a part "includes" an element, it may further include another element, rather than excluding another element, unless otherwise indicated.

In the drawings, to clearly describe exemplary embodiments, an X direction, a Y direction, and a Z direction are defined as a length direction, a width direction and a thickness direction of a multilayer capacitor and a capacitor array, respectively.

The width direction may be considered the same as a layering direction in which dielectric layers are layered.

Figure 2A:
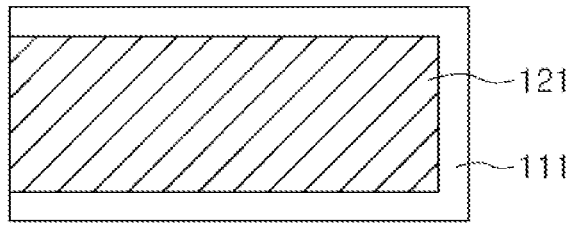
FIGS. 2A and 2B are top views illustrating first and second internal electrodes applied in a multilayer capacitor in FIG. 1.
Figure 2B:
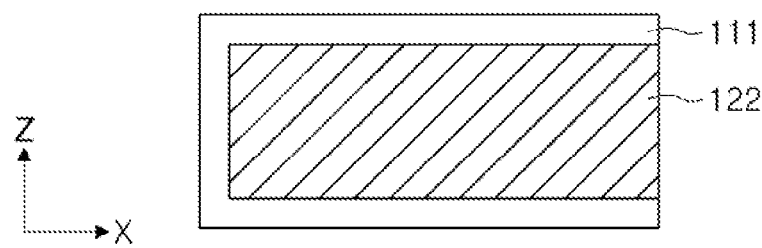
Figure 3:
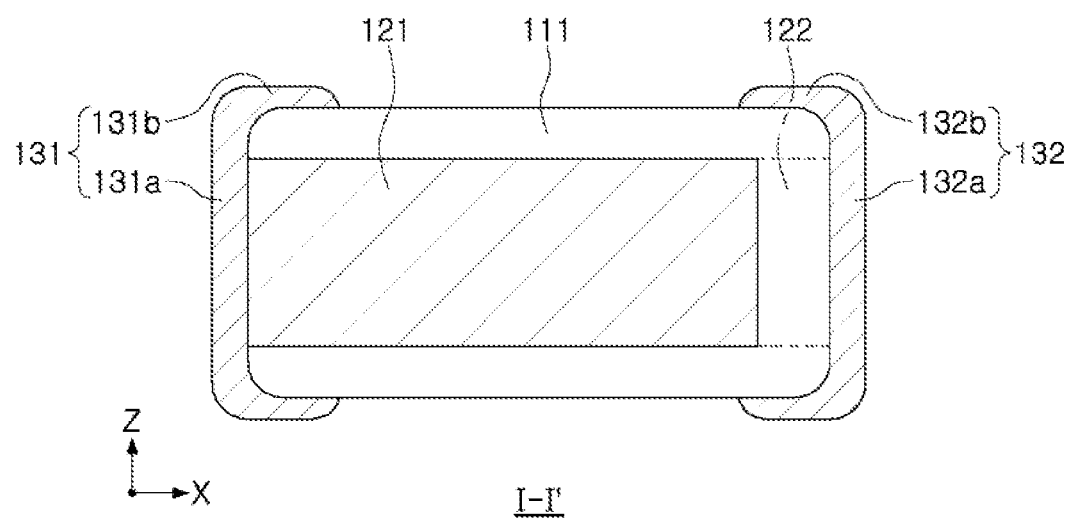
FIG. 3 is a cross-sectional diagram taken along line I-I' in FIG. 1.

FIG. 1 is a perspective diagram illustrating a multilayer capacitor according to an exemplary embodiment. FIGS. 2A and 2B are top views illustrating first and second internal electrodes applied to a multilayer capacitor in FIG. 1. FIG. 3 is a cross-sectional diagram taken along line I-I' in FIG. 1.

A multilayer capacitor used in an electronic component in an exemplary embodiment will be described with reference to FIGS. 1 to 3.

Referring to FIGS. 1 to 3, a multilayer capacitor 100 in the exemplary embodiment may include a body 110 and first and second external electrodes 131 and 132 disposed on both ends of the body 110 in an X direction.

The body 110 may be formed by a plurality of dielectric layers 111 being layered in a Y direction and being sintered, and the dielectric layers 111 may be integrated, such that boundaries between adjacent dielectric layers 111 may be difficult to identify without using a scanning electron microscope (SEM).

The body 110 may include the plurality of dielectric layers 111 and first and second internal electrodes 121 and 122 alternately disposed with the dielectric layer 111 interposed therebetween and having different polarities.

The body 110 may also include an active area, a portion contributing to forming capacitance of the capacitor, and a cover disposed in upper and lower portions of the active area in a Z direction as upper and lower margin portions.

The shape of the body 110 may not be particularly limited. For example, the body 110 may have a hexagonal shape. The body 110 may also include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2 and the third and fourth surfaces 3 and 4, and opposing each other in the Y direction.

The dielectric layer 111 may include a ceramic powder. For example, the dielectric layer 111 may include a $BaTiO_3$ ceramic powder, and the like.

The $BaTiO_3$ ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ in which Ca or Zr is partially employed in $BaTiO_3$, but the $BaTiO_3$ ceramic powder is not limited thereto.

Also, the dielectric layer 111 may further include ceramic additives, organic solvents, plasticizers, coupling agents, dispersing agents, and the like, in addition to the ceramic powder.

As the ceramic additive, transition metal oxides or transition metal carbides, rare earth elements, magnesium (Mg), aluminum (Al), and the like, may be used.

The first and second internal electrodes 121 and 122 may be configured to have different polarities, and may be disposed on the dielectric layer 111 and layered in a Y direction. The first and second internal electrodes 121 and 122 may be alternately disposed with a single dielectric layer 111 interposed therebetween to oppose each other in a Y direction in the body 110.

One ends of the first and second internal electrodes 121 and 122 may be exposed through the third and fourth surfaces 3 and 4 of the body 110.

In this case, the first and second internal electrodes 121 and 122 may be insulated from each other by the dielectric layer 111 interposed therebetween.

End portions of the first and second internal electrodes 121 and 122 alternately exposed through the third and fourth surfaces 3 and 4 of the body 110 may be electrically connected to the first and second external electrodes 131 and 132 disposed on both ends of the body 110 in an X direction.

By the configuration as above, when a certain voltage is applied to the first and second external electrodes 131 and 132, an electric charge may be accumulated between the first and second internal electrodes 121 and 122.

In this case, the capacitance of the multilayer capacitor 100 may be proportionate to an area of overlap between the first and second internal electrodes 121 and 122, which overlap each other in a Y direction in the active area.

A material forming the first and second internal electrodes 121 and 122 may not be particularly limited, and may be formed of a conductive paste comprised of more than one material among noble metals such as palladium (Pd), a palladium-silver (Pd—Ag) alloy, and the like, and nickel (Ni) and copper (Cu), for example.

As the method of printing a conductive paste, a screen printing method, a gravure printing method, or the like, may be used, but the method of printing is not limited thereto.

The first and second external electrodes 131 and 132 may be provided with voltages having different polarities, may be disposed on both ends of the body 110 in an X direction, and may be connected to the exposed portions of the first and second internal electrodes 121 and 122 and electrically connected to the first and second internal electrodes 121 and 122, respectively.

The first external electrode 131 may include a first head portion 131a and a first band portion 131b.

The first head portion 131a may be disposed on the third surface 3 of the body 110, may be in contact with the portion of the first internal electrode 121 exposed externally through the third surface 3 of the body 110 and may serve to connect the first internal electrode 121 and the first external electrode 131.

The first band portion 131b may be a portion extended to portions of the first and second surfaces 1 and 2 of the body 110 from the first head portion 131a and connected to a first metal frame 140.

In this case, the first band portion 131b may be configured to be further extended to portions of the fifth and sixth surfaces 5 and 6 of the body 110 from the first head portion 131a to improve adhesion force, or for other purposes, if necessary.

The second external electrode 132 may be disposed on the other end of the body 110 in an X direction.

In this case, the second external electrode 132 may include a second head portion 132a and a second band portion 132b.

The second head portion 132a may be disposed on the fourth surface 4 of the body 110, may be in contact with a portion of the second internal electrode 122 externally exposed through the fourth surface 4 of the body 110, and may serve to connect the second internal electrode 122 and the second external electrode 132.

The second band portion 132b may be a portion extended to portions of the first and second surfaces 1 and 2 of the body 110 from the second head portion 132a and connected to a second metal frame 150.

In this case, the second band portion 132b may be configured to be further extended to portions of the fifth and sixth surfaces 5 and 6 of the body 110 from the second head portion 132a to improve adhesion force, or for other purposes, if necessary.

Meanwhile, the first and second external electrodes 131 and 132 may further include a plating layer.

The plating layer may include first and second nickel (Ni) plating layers, and first and second tin (Sn) plating layers covering the first and second nickel (Ni) plating layers, respectively.

Figure 4:
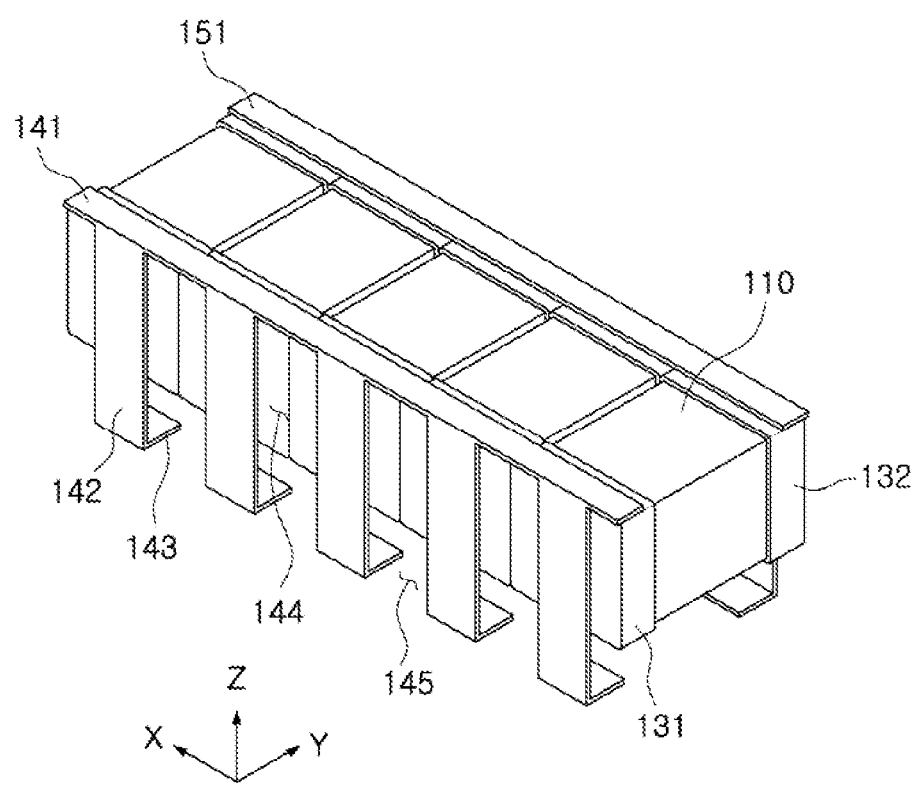
FIG. 4 is a perspective diagram illustrating an exemplary structure of an electronic component according to an exemplary embodiment in the present disclosure.
Figure 5:
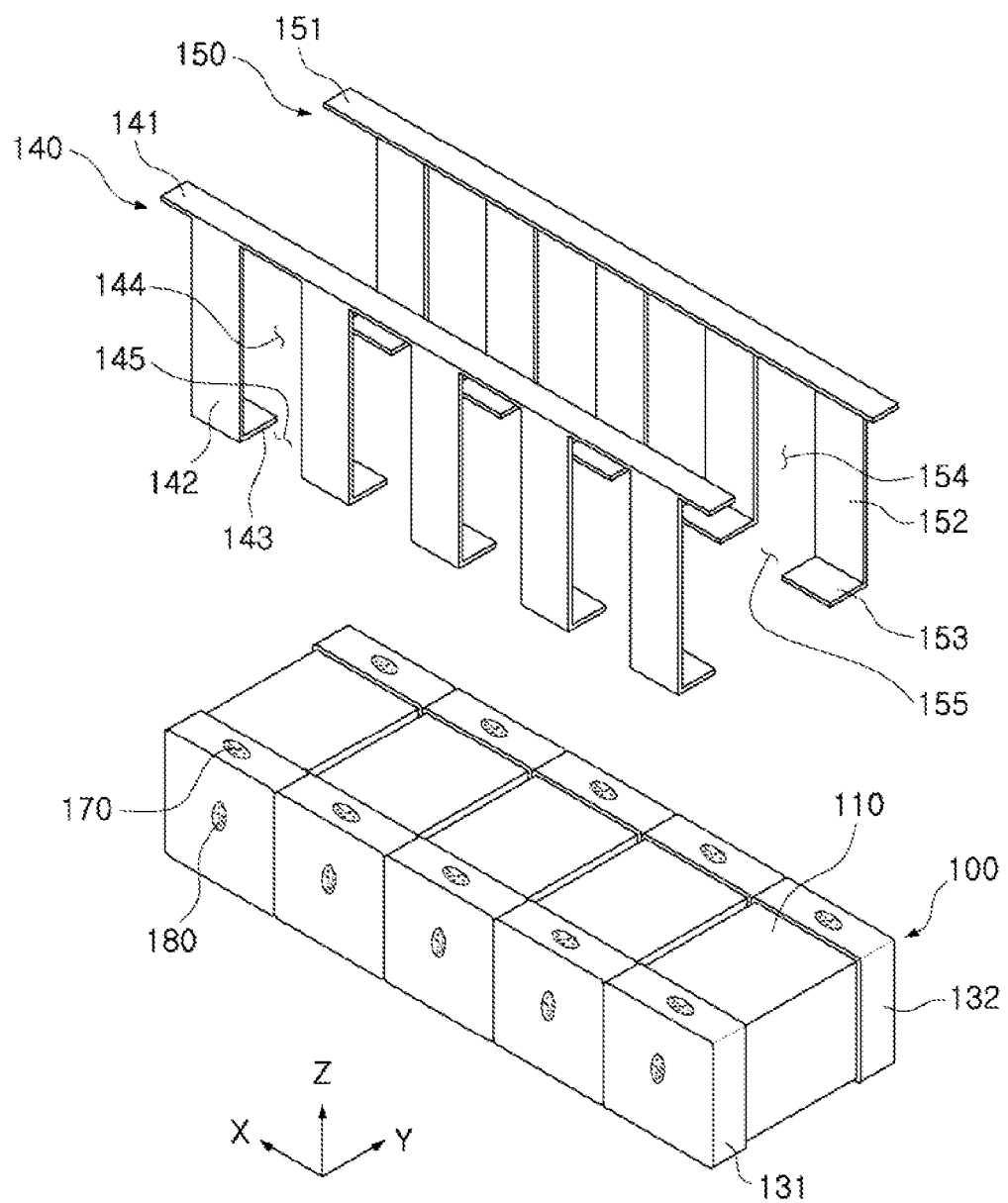
FIG. 5 is a perspective diagram of a division of an electronic component in FIG. 4.

FIG. 4 is a perspective diagram illustrating an exemplary structure of an electronic component according to an exemplary embodiment. FIG. 5 is a perspective diagram of a division of an electronic component in FIG. 4.

Referring to FIGS. 4 and 5, an electronic component according to an exemplary embodiment may include a capacitor array configured to include a plurality of multilayer capacitors 100 consecutively disposed in an X direction, a horizontal direction, a first metal frame 140 configured to be disposed on one side surface of the capacitor array in a Y direction and to be connected to a first external electrode 131 of each of the plurality of multilayer capacitors, and a second metal frame 150 configured to be disposed on the other side surface of the capacitor array in a Y direction and to be connected to a second external electrode 132 of each of the plurality of multilayer capacitors 100.

The first metal frame 140 may be bonded to the first external electrode 131 of each of the plurality of multilayer capacitors 100 and serve as a common electrode connecting adjacent first external electrodes 131 to each other.

The first metal frame 140 may include a first horizontal bonding portion 141, a first horizontal mounting portion 143, and a first vertical portion 142.

The first horizontal bonding portion 141 may be lengthened in an X direction, and may be bonded to an upper portion of a first band portion 131b of each of the plurality of first external electrodes 131 and electrically and physically connect upper portions of the first band portions 131b of the plurality of first external electrodes 131 to each other.

In this case, a conductive adhesive portion 170 may be disposed in a position corresponding to the first horizontal bonding portion 141 in an upper portion of the first band portion 131b of each of the first external electrodes 131.

The conductive adhesive portion 170 may be formed of a high temperature solder or a conductive bonding material, but the conductive adhesive portion 170 is not limited thereto.

The first horizontal mounting portion 143 may be disposed to oppose the first horizontal bonding portion 141 in a Z direction, and may serve as a connection terminal when the first horizontal mounting portion 143 is mounted on a substrate.

Also, the first horizontal mounting portion 143 may be spaced apart from a lower surface of the multilayer capacitor 100 by a predetermined distance in a Z direction.

In addition, the first horizontal mounting portion 143 may have at least one third cutout portion 145 in an X direction.

The first vertical portion 142 may be extended from a tip end of the first horizontal bonding portion 141 to a lower portion, and a lower end of the first vertical portion 142 may be connected to a tip end of the first horizontal mounting portion 143.

Also, the first vertical portion 142 may be bonded to the first head portion 131a of each of the plurality of first external electrodes 131 and electrically and physically connect the first head portions 131a of the plurality of first external electrodes 131 in an X direction.

Also, the first vertical portion 142 may be configured to have at least one first cutout portion 144 formed in an X direction, such that an area of the first vertical portion 142 may be smaller than an overall area of the first head portions 131a of the first external electrodes 131.

Accordingly, the first vertical portion 142 may be positioned in a central portion of the first head portion 131a of each of the first external electrodes 131 in an X direction.

In this case, a conductive adhesive portion 180 may be disposed in a position corresponding to the first vertical portion 142 in the first head portion 131a of the first external electrode 131.

Also, a length of the first vertical portion 142 taken in an X direction may be configured to be similar to a length of a capacitor array such that the first vertical portion 142 may be connected to the first external electrode 131 of all the multilayer capacitors 100.

The second metal frame 150 may be bonded to the second external electrode 132 of each of the plurality of multilayer capacitors 100 and serve as a common electrode connecting adjacent second external electrodes 132.

The second metal frame 150 may include a second horizontal bonding portion 151, a second horizontal mounting portion 153, and a second vertical portion 152.

The second horizontal bonding portion 151 may be lengthened in an X direction, and may be bonded to an upper portion of a second band portion 132b of each of the plurality of second external electrodes and electrically and physically connect the upper portions of the second band portions 132b of the plurality of second external electrodes 132.

In this case, a conductive adhesive portion 170 may be disposed in a position corresponding to the second horizontal bonding portion 151 in the upper portion of the second band portion 132b of each of the second external electrodes 132.

The second horizontal mounting portion 153 may be disposed to oppose the second horizontal bonding portion 151 in a Z direction and serve as a connection terminal when the second horizontal mounting portion 153 is mounted on a substrate.

Also, the second horizontal mounting portion 153 may be configured to be spaced apart from a lower surface of the multilayer capacitor 100 by a predetermined distance in a Z direction.

Also, the second horizontal mounting portion 153 may be configured to have at least one fourth cutout portion 155 in an X direction.

The second vertical portion 152 may be extended from a tip end of the second horizontal bonding portion 151 to a lower portion, and a lower end of the second vertical portion 152 may be connected to a tip end of the second horizontal mounting portion 153.

Also, the second vertical portion 152 may be bonded to the second head portion 132a of each of the plurality of second external electrodes 132 and electrically and physically connect the second head portion 132a of the plurality of second external electrodes 132 in an X direction.

Also, the second vertical portion 152 may be configured to have at least one second cutout portion 154 formed in an X direction, such that an area of the second vertical portion 152 may be smaller than an overall area of the second head portions 132a of the second external electrodes 132.

Accordingly, the second vertical portion 152 may be positioned in a central portion of the second head portion 132a of each of the second external electrodes 132 in an X direction.

In this case, the conductive adhesive portion 180 may be disposed in a position corresponding to the second vertical portion 152 in the second head portion 132a of each of the second external electrode 132.

Also, a length of the second vertical portion 152 taken in an X direction may be configured to be similar to a length of a capacitor array such that the second vertical portion 152 may be connected to the first external electrodes 132 of all the multilayer capacitors 100.

Meanwhile, in the electronic component in the exemplary embodiment, in the case in which an overall area of the first head portion 131a or the second head portion 132a of the first external electrode 131 or the second external electrode 132 is defined as "At", and an area of the first vertical portion 142 or the second vertical portion 152 is defined as "Am," $0.2 \leq Am/At \leq 0.9$ may be satisfied.

According to the exemplary embodiment, by including the capacitor array comprising the plurality of multilayer capacitors, high capacitance may be implemented, and also, by securing a gap between the capacitor array and a mounting substrate using the metal frame, stress arisen from the substrate may not be directly conveyed to the multilayer capacitor when the electronic component is mounted on the substrate, thereby improving thermal reliability and mechanical reliability of the electronic component.

Meanwhile, in the case in which the metal frame is bonded to both side surfaces of the capacitor array, the metal frame may be properly bonded to the side surfaces of the capacitor array at room temperature, but in an environment in which use temperature changes significantly as in electrical components, stress may occur at an interfacial surface between the metal frame and the external electrode of the multilayer capacitor bonded to each other due to a difference between thermal expansion coefficients of the metal frame and the external electrode, which may cause degradation in bonding strength and crack defects.

According to the exemplary embodiment, the first and second vertical portions 142 and 152 may be configured to have the first and second cutout portions 144 and 154 formed in an X direction, such that a discontinuous surface on which the metal frame is not formed may be partially disposed in the first and second vertical portions 142 and 152.

Accordingly, a certain level of electrical and physical bonding properties of the first and second metal frames 140 and 150 may be secured, and stress caused by thermal impacts may be prevented by partially reducing an area in which the first and second vertical portions 142 and 152 are bonded to the first and second external electrodes 131 and 132.

In this case, the bonding strength reduced in the first and second vertical portions 142 and 152 by arranging the first and second cutout portions 144 and 154 may be compensated by bonding strength formed when the first and second horizontal bonding portions 141 and 151 of the first and second metal frames 140 and 150 are bonded to the first and second band portions 131b and 132b of the first and second external electrodes 131 and 132.

Thus, a degradation in bonding strength and crack defects of the first and second metal frames 140 and 150 may be prevented simultaneously, thereby improving reliability of the electronic component.

Figure 6:
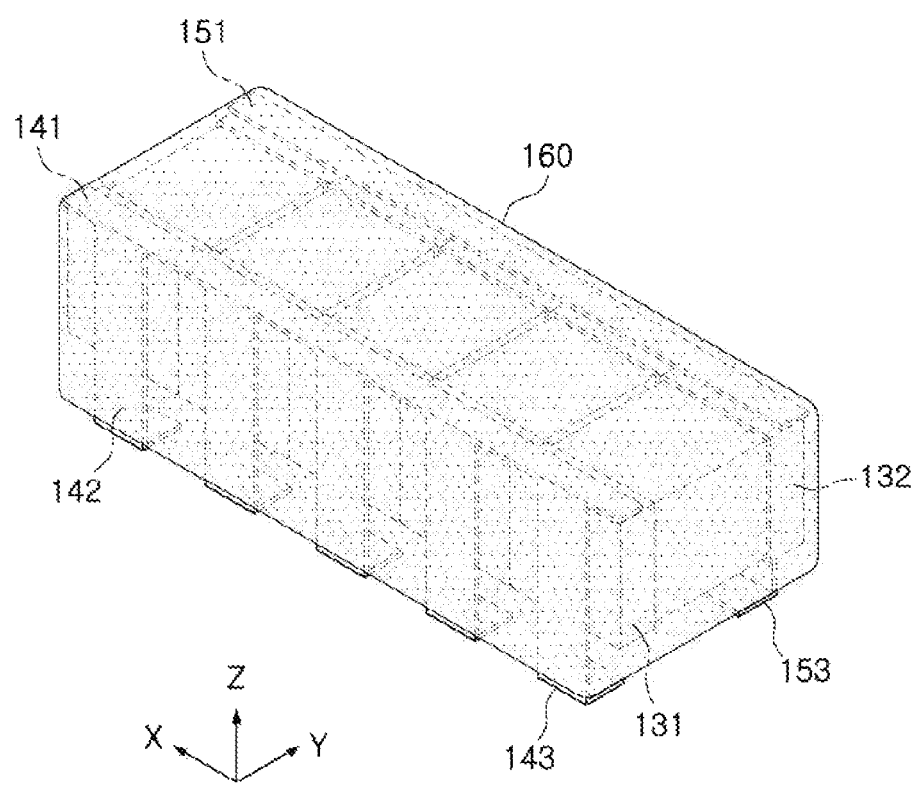
FIG. 6 is a perspective diagram illustrating a configuration in which an encapsulation portion is disposed in an electronic component.

FIG. 6 is a perspective diagram illustrating a configuration in which an encapsulation portion is disposed in an electronic component.

Referring to FIG. 6, the electronic component may further include an encapsulation portion 160 configured to encapsulate a capacitor array.

The encapsulation portion 160 may be formed of an insulating resin such as an epoxy, and may be configured to encapsulate all the portions of the electronic component in the first and second metal frames 140 and 150 except for first and second horizontal mounting portions 143 and 153.

The encapsulation portion 160 may serve to improve a bonding state of the capacitor array and the first and second metal frames 140 and 150, and improve reliability against an external environment.

Figure 7:
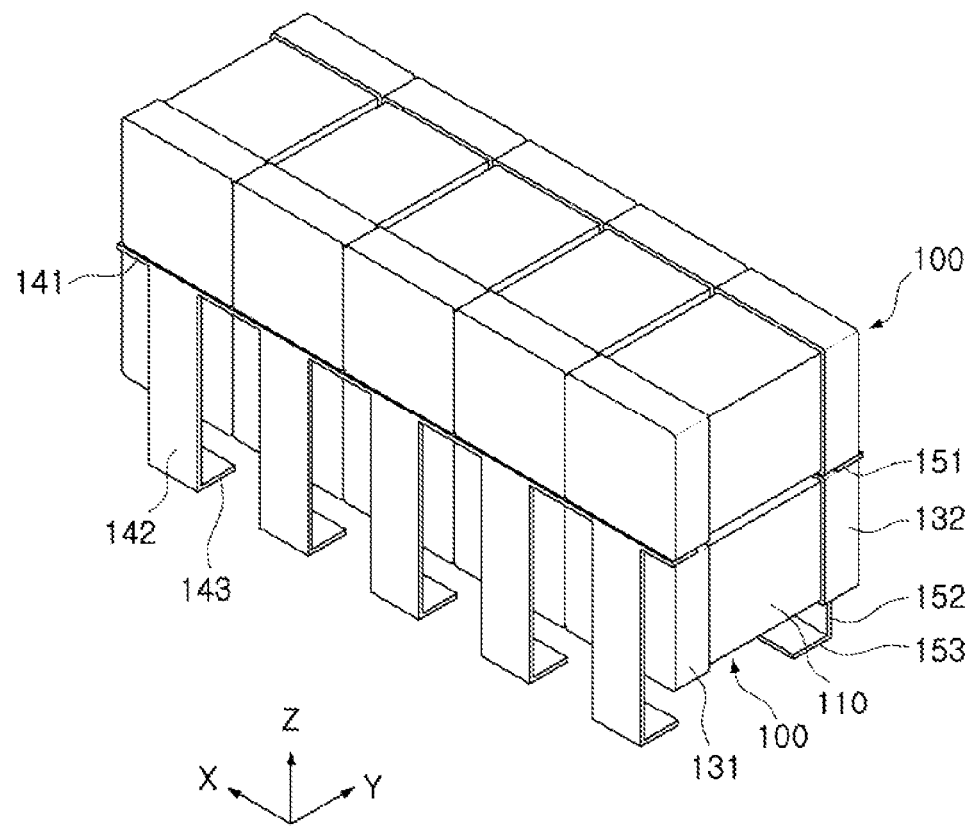
FIG. 7 is a perspective diagram illustrating an exemplary structure of an electronic component according to another exemplary embodiment in the present disclosure.
Figure 8:
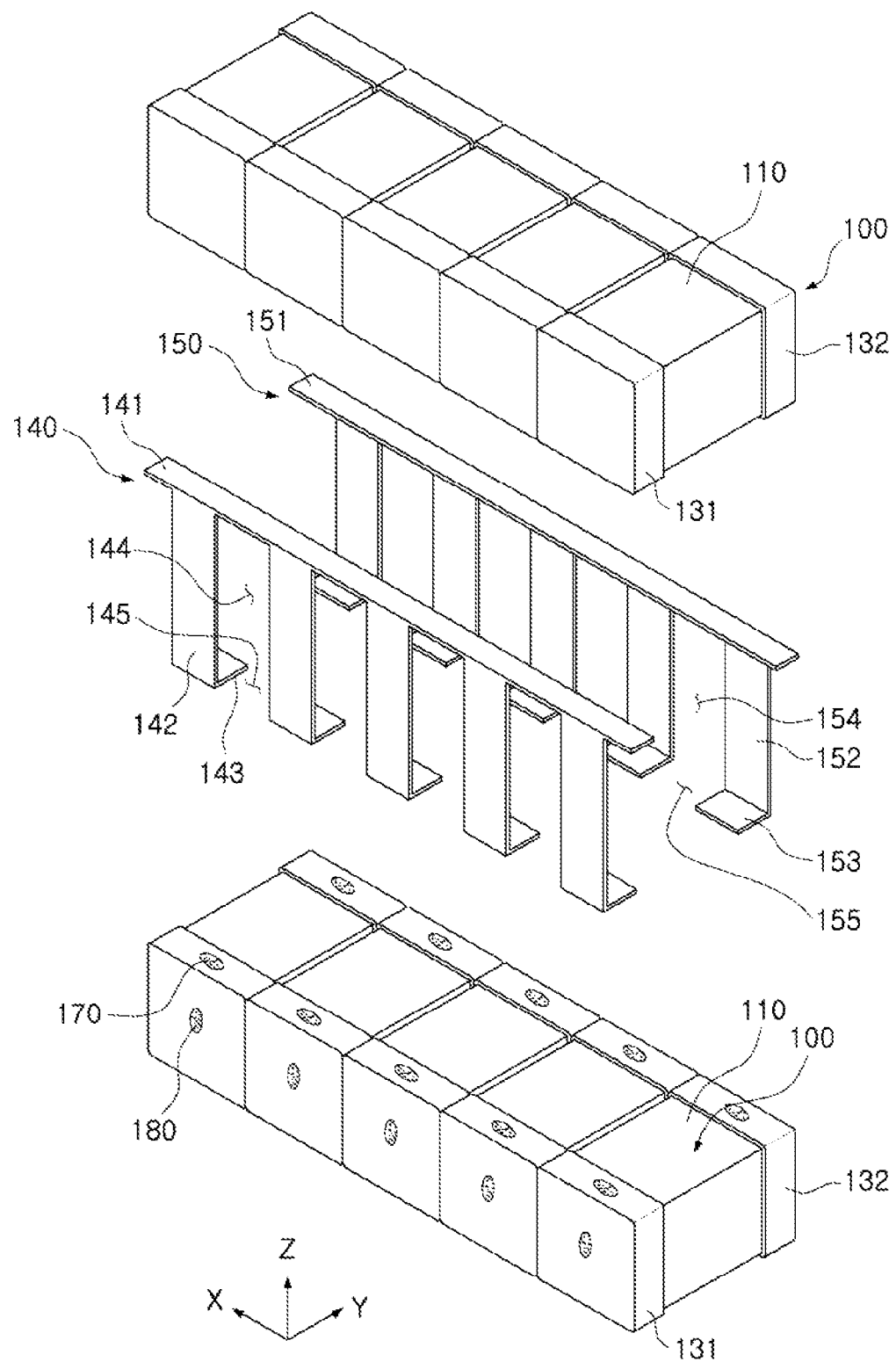
FIG. 8 is a perspective diagram of a division of an electronic component in FIG. 7.

FIG. 7 is a perspective diagram illustrating an exemplary structure of an electronic component according to another exemplary embodiment. FIG. 8 is a perspective diagram of a division of an electronic component in FIG. 7.

Referring to FIGS. 7 and 8, in the electronic component according to an exemplary embodiment, a capacitor array may be stacked in two or more layers in a Z direction.

The capacitor array disposed in an upper portion may be configured such that lower portions of first band portions 131b may be bonded to an upper surface of a first horizontal bonding portion 141 of a first metal frame 140, and lower portions of a second band portions 132b may be bonded to an upper surface of a second horizontal bonding portion 151 of a second metal frame 150.

Meanwhile, the diagrams illustrate the example in which the capacitor array is stacked in two layers, but an exemplary embodiment thereof is not limited to. The capacitor array may be stacked in three or more layers if necessary.

Figure 9:
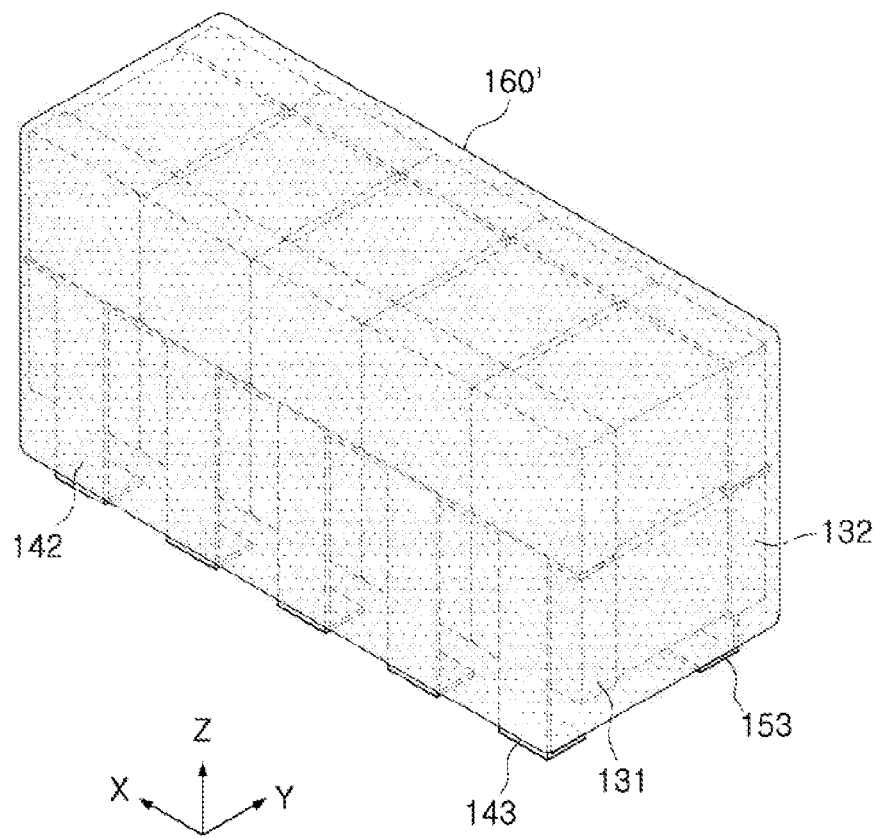
FIG. 9 is a perspective diagram illustrating a configuration in which an encapsulation portion is disposed in an electronic component.

FIG. 9 is a perspective diagram illustrating a configuration in which an encapsulation portion is disposed in an electronic component.

Referring to FIG. 9, the electronic component may further include an encapsulation portion 160' configured to encapsulate a plurality of capacitor arrays.

The encapsulation portion 160' may be formed of an insulating resin such as an epoxy, and may be configured to encapsulate all the portions of the electronic component in the first and second metal frames 140 and 150 except for first and second horizontal mounting portions 143 and 153.

Figure 10:
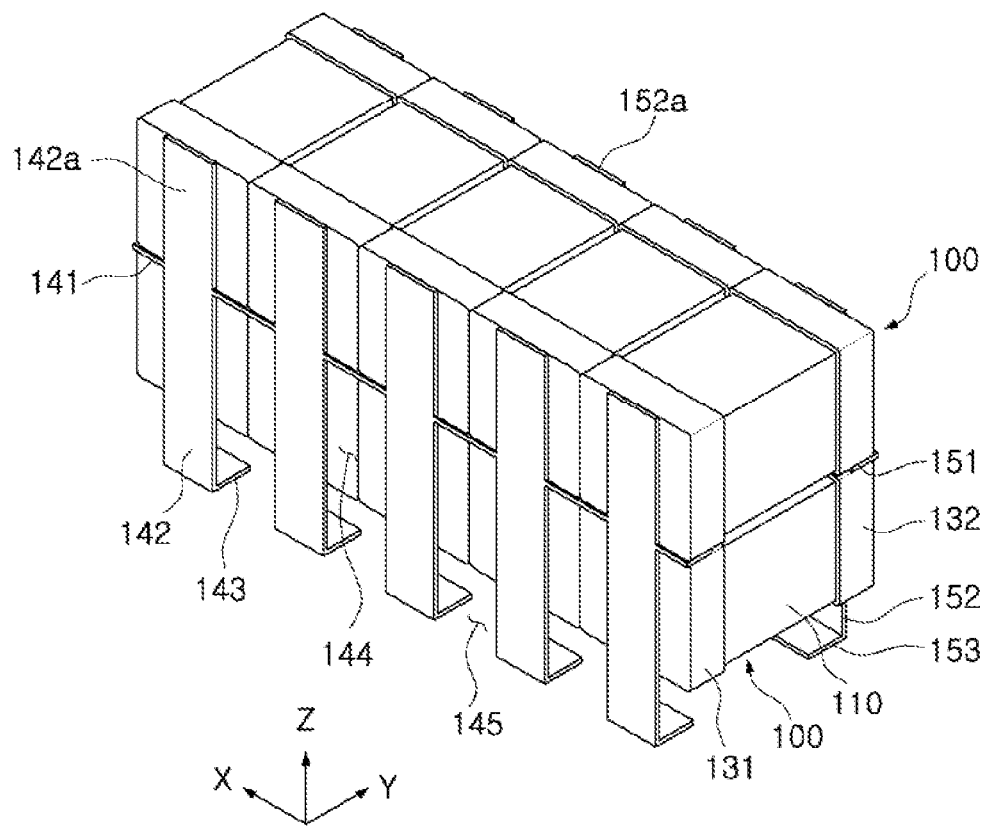
FIG. 10 is a perspective diagram illustrating an exemplary structure of an electronic component according to another exemplary embodiment in the present disclosure.
Figure 11:
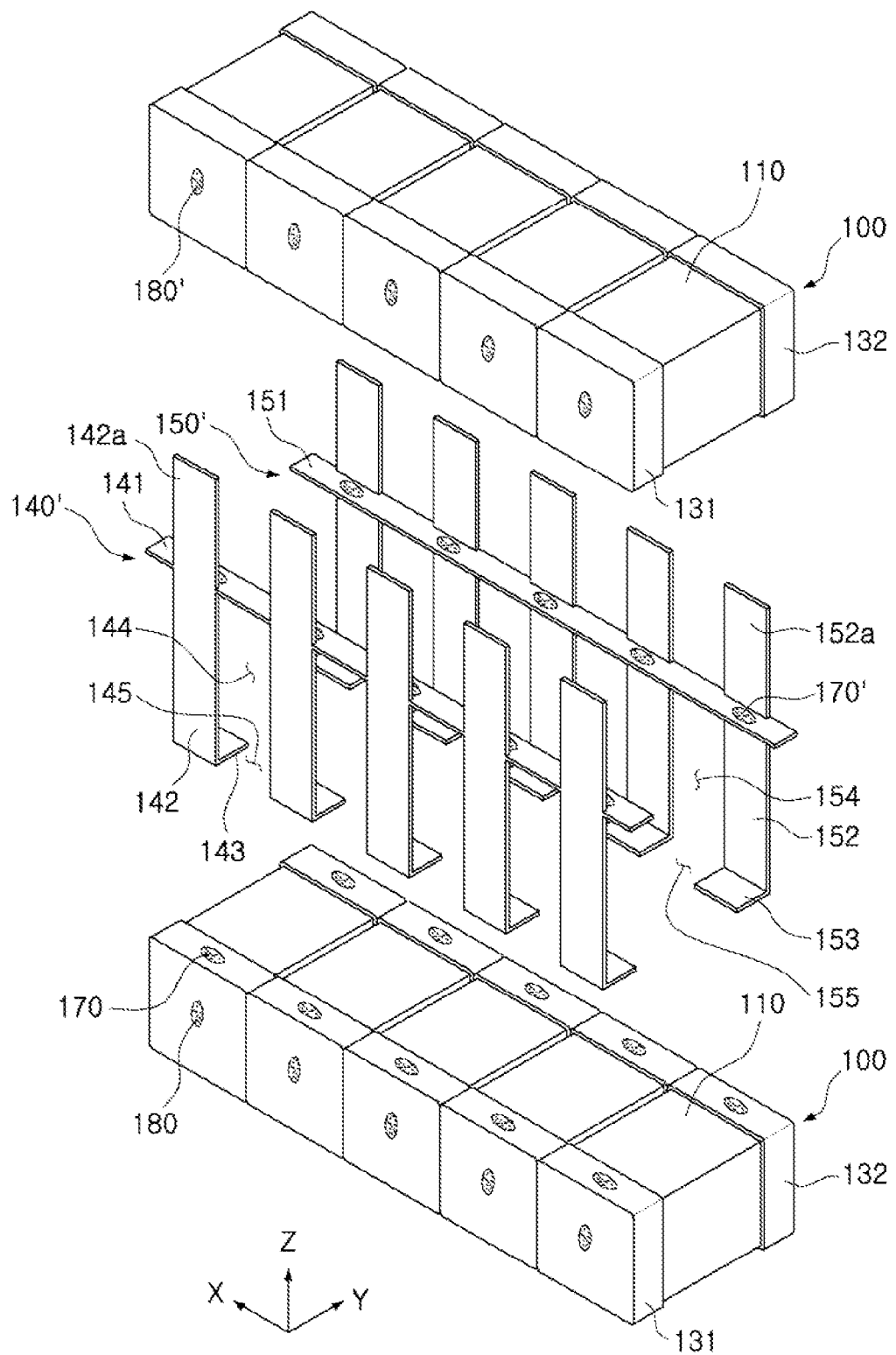
FIG. 11 is a perspective diagram of a division of an electronic component in FIG. 10.

FIG. 10 is a perspective diagram illustrating an exemplary structure of an electronic component according to another exemplary embodiment. FIG. 11 is a perspective diagram of a division of an electronic component in FIG. 10.

Referring to FIGS. 10 and 11, in the electronic component according to the exemplary embodiment, a capacitor array may be stacked in two or more layers in a Z direction.

The capacitor array disposed in an upper portion may be configured such that lower portions of first band portions 131b may be bonded to an upper surface of a first horizontal bonding portion 141 of a first metal frame 140', and lower portions of second band portions 132b may be bonded to an upper surface of a second horizontal bonding portion 151 of a second metal frame 150'.

A difference between the exemplary embodiment in FIGS. 10 and 11 and the exemplary embodiment in FIG. 7 is that the exemplary embodiment in FIGS. 10 and 11 may include a first extending portion 142a, which is extended in a Z direction such that a first vertical portion 142 of the first metal frame 140' may be bonded to a head portion 131a of a first external electrode 131 of a multilayer capacitor 100 forming a capacitor array disposed in an upper portion, and a second extending portion 152a, which is extended in a Z direction such that a second vertical portion 152 of the second metal frame 150' may be bonded to a second head portion 132a of a second external electrode 132 of the multilayer capacitor 100 forming the capacitor array disposed in the upper portion.

In this case, a first space portion may be formed between the plurality of first extending portions 142a, and a second space portion may be formed between the plurality of second extending portions 152a.

Accordingly, an area of the capacitor array disposed in the upper portion in which the first and second extending portions 142a and 152a are bonded to the first and second external electrodes 131 and 132 may be reduced, so that stress caused by thermal impacts may be further prevented.

Also, in the capacitor array disposed in the upper portion, a conductive adhesive portion 180' may be further disposed in a position corresponding to the extending portion 142a of the first vertical portion 142 in the first head portion 131a of each of the first external electrodes 131.

Also, in the capacitor array disposed in the upper portion, a conductive adhesive portion 180' may be further disposed in a position corresponding to the extending portion 152a of the second vertical portion 152 in the second head portion 132a of each of the second external electrodes 132.

Meanwhile, the diagrams illustrate the example in which the capacitor array is stacked in two layers, but an exemplary embodiment thereof is not limited to. The capacitor array may be stacked in three or more layers if necessary.

Also, if necessary, the electronic component according to the exemplary embodiment may be configured to have multiple layers and multiple columns.

Figure 12:
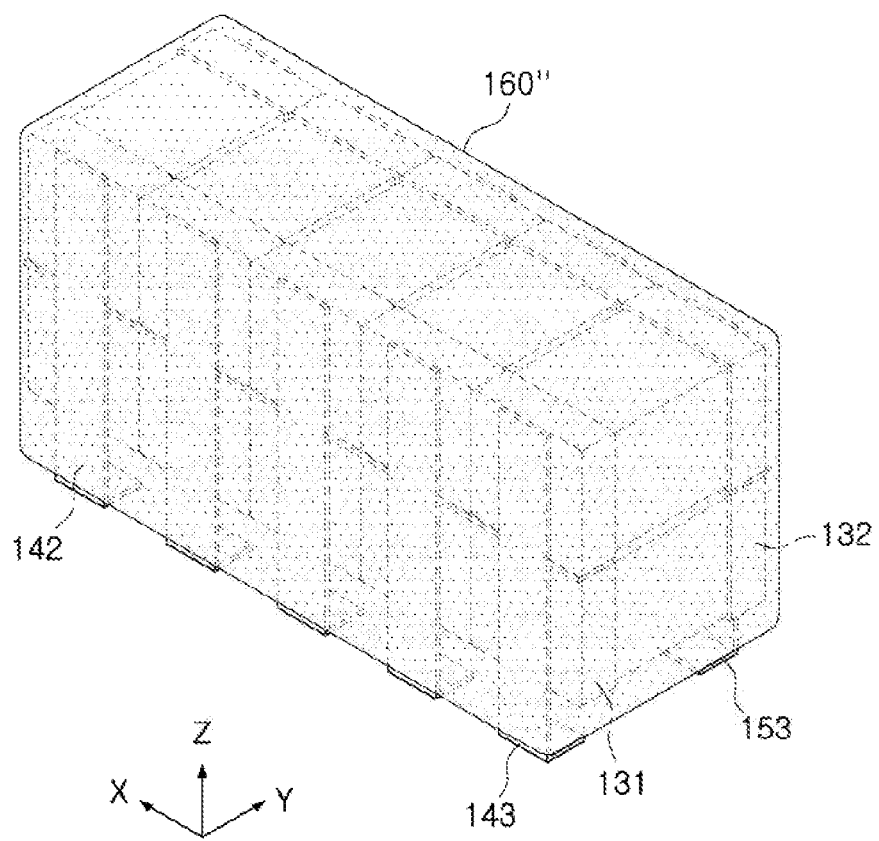
FIG. 12 is a perspective diagram illustrating a configuration in which an encapsulation portion is disposed in an electronic component.

FIG. 12 is a perspective diagram illustrating a configuration in which an encapsulation portion is disposed in an electronic component.

Referring to FIG. 12, the electronic component may further include an encapsulation portion 160".

The encapsulation portion 160" may be formed of an insulating resin such as an epoxy, and may be configured to encapsulate all the portions of the electronic component in the first and second metal frames 140' and 150' except for first and second horizontal mounting portions 143 and 153.

Embodiment

FIGS. 13 to 18 are graphs illustrating results of a warpage test depending on a structure of a metal frame.

A multilayer capacitor used in each sample was configured to have a length of 3.2 mm and a width of 2.5 mm, and have electrical properties of 10 uF. The capacitor array used in the test was configured to have 10 multilayer capacitors disposed in two layers and five columns, and a temperature cycle of −55° C. to 125° C. was applied one hundred times in the test.

A metal frame was configured such that a gap between a horizontal mounting portion and a bottom surface of the multilayer capacitor is 0.25 mm.

In the description below, an area of a head portion of an external electrode in one of both end portions of the capacitor array will be defined as "At," an area of a vertical portion of the metal frame bonded to the head portion will be defined as "Am," and a shape of the metal frame in each sample will be described.

Figure 13:
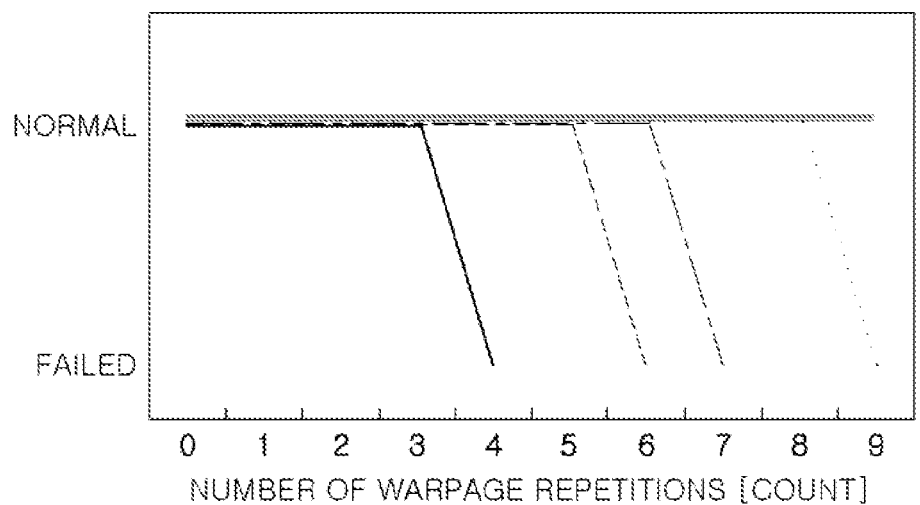
FIGS. 13 to 18 are graphs illustrating a result of a warpage test depending on a structure of a metal frame.
Figure 14:
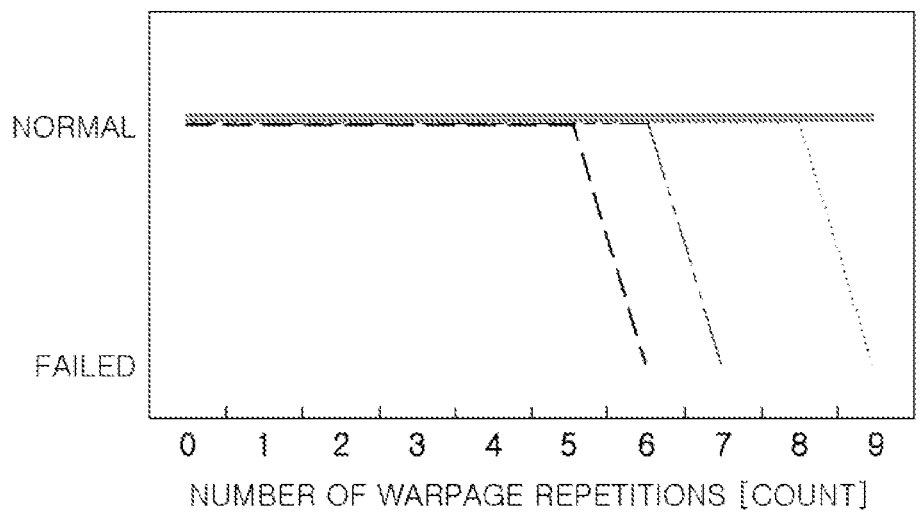

FIG. 13 illustrates a comparative example in which a cutout portion was not formed in the vertical portion of the metal frame, and Am/At was 1.0. FIG. 14 illustrates an example in which a length of the vertical portion taken in an X direction was shorter than a length of the capacitor array taken in an X direction, so that the cutout portion was formed on both ends of the vertical portion in an X direction, and Am/At was 0.9.

Figure 15:
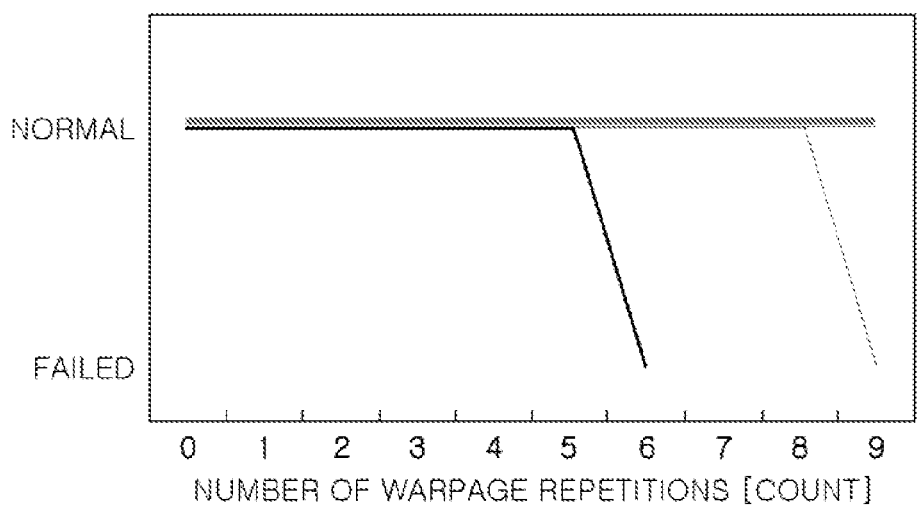
Figure 16:
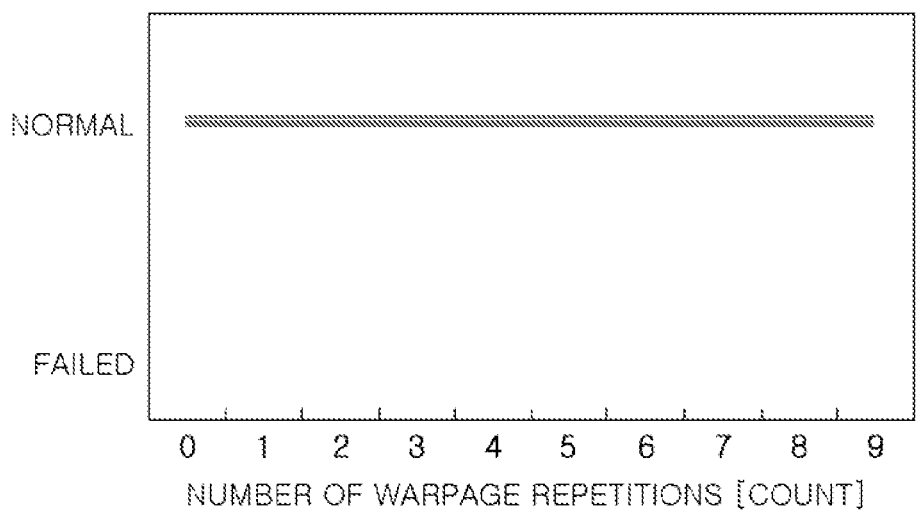

FIG. 15 illustrates an example in which four cutout portions were formed in the vertical portion in an X direction, and Am/At was 0.95. FIG. 16 illustrates an example in which four cutout portions were formed in the vertical portion in an X direction while a width of the cutout portion was configured to be greater than the width of the cutout portion in FIG. 15, such that Am/At was 0.9.

Figure 17:
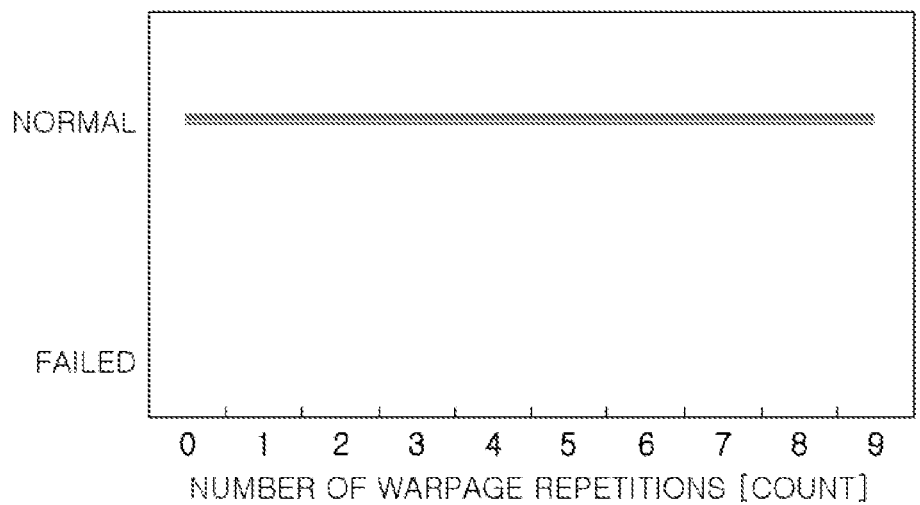
Figure 18:
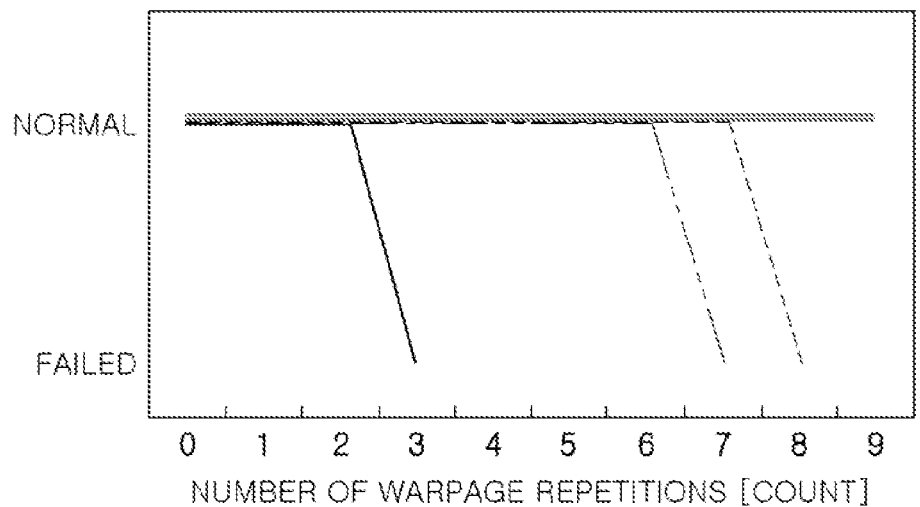

FIG. 17 illustrates an example in which the cutout portion was formed on both ends of the vertical portion in an X direction, and four cutout portions were formed inwardly, while a width of the cutout portion was configured to be greater than the width of the cutout portion in FIG. 16, such that Am/At is 0.20. FIG. 18 illustrates an example in which the cutout portion was formed on both ends of the vertical portion in an X direction, and four cutout portions were formed inwardly, while a width of the cutout portion was configured to be greater than the width of the cutout portion in FIG. 17, such that Am/At was 0.10.

To compare the effect of thermal warpage stress depending on changes in area of the head portion of the external electrode and area of the vertical portion of the metal frame, a warpage crack test was carried out using the samples described above.

In the warpage crack test, after an electronic component was mounted on a substrate, a surface of the substrate on which the electronic component was mounted was disposed to face downward, a support was disposed in each position spaced apart from the ends of the electronic component by a predetermined distance, and while repeatedly pressing a surface opposite to the surface of the substrate on which the electronic component was mounted until the substrate was deformed by 10 mm, whether cracking occurred in the electronic component or in the mounting portion or whether a current value radically increased was identified and measured.

Referring to FIGS. 13 to 18, in the case of the comparative example, a warpage defect occurred in number 4, and in the case of the example in FIG. 14 in which, although the cutout portions were present, the cutout portions were only formed on both ends of the vertical portions, a warpage defect also occurred.

Also, in the case in which the cutout portion was formed inwardly of the vertical portion, a warpage defect did not occur mostly, but a warpage defect occurred in the sample in FIG. 15 in which Am/At was 0.95 and in the sample in FIG. 18 in which Am/At was 0.10.

Thus, the appropriate range of the value of Am/At may be within a range of 0.9 to 0.2.

According to the aforementioned exemplary embodiments, durability and reliability of the electronic component against vibrations and deformation may improve while implementing high capacitance.

While the exemplary embodiments have been shown and described above, it will be apparent to those skilled in the art that modifications and variations could be made without departing from the scope of the present invention as defined by the appended claims.

What is claimed is:

1. An electronic component, comprising:
a capacitor array including a plurality of multilayer capacitors consecutively disposed in a horizontal direction;
a first metal frame disposed on one side surface of the capacitor array and connected to a first external electrode of each of the plurality of multilayer capacitors; and
a second metal frame disposed on the other side surface of the capacitor array and connected to a second external electrode of each of the plurality of multilayer capacitors,
wherein the first metal frame comprises a first horizontal bonding portion bonded to an upper portion of the plurality of the first external electrodes, a first horizontal mounting portion disposed to oppose the first horizontal bonding portion in a vertical direction, which is orthogonal to the horizontal direction, and a first vertical portion connecting the first horizontal bonding portion and the first horizontal mounting portion and having at least one first cutout portion in the horizontal direction,
wherein the second metal frame comprises a second horizontal bonding portion bonded to an upper portion of the plurality of the second external electrodes, a second horizontal mounting portion disposed to oppose the second horizontal bonding portion in the vertical direction, and a second vertical portion connecting the second horizontal bonding portion and the second horizontal mounting portion and having at least one second cutout portion in the horizontal direction,
wherein the first and second horizontal mounting portions are spaced apart from the plurality of multilayer capacitors,
wherein the first and second horizontal mounting portions of the first and second metal frames respectively have at least one third cutout portion and at least one fourth cutout portion in the horizontal direction,
wherein the at least one third cutout portion and the at least one fourth cutout portion respectively extend to inner ends of the first and second metal frames in a length direction which is orthogonal to the horizontal and vertical directions,
wherein the first and second vertical portions and the first and second horizontal mounting portions are provided in plural, and
wherein a width of a space between consecutive vertical portions of the plurality of first and second vertical portions is substantially the same as a width of a space between consecutive horizontal mounting portions of the plurality of first and second horizontal mounting portions.

2. The electronic component of claim 1, wherein a conductive adhesive portion is disposed between the first external electrode and the first horizontal bonding portion and between the first external electrode and the first vertical portion, and a conductive adhesive portion is disposed between the second external electrode and the second horizontal bonding portion and between the second external electrode and the second vertical portion.

3. The electronic component of claim 1, further comprising:

an encapsulation portion encapsulating the capacitor array, wherein the first and second horizontal mounting portions are externally exposed from the encapsulation portion.

4. The electronic component of claim 1, wherein the multilayer capacitor comprises a body and the first and second external electrodes disposed on both ends of the body in the length direction, and the body comprises a dielectric layer and first and second internal electrodes alternately disposed in a width direction, which is parallel to the horizontal direction, with the dielectric layer interposed therebetween.

5. The electronic component of claim 4, wherein the first and second external electrodes respectively include first and second head portions disposed on both end surfaces of the body in the length direction, and first and second band portions extending in the length direction from the first and second head portions to portions of upper and lower surfaces of the body.

6. The electronic component of claim 5, wherein the first vertical portion is positioned in a central portion of each of the first head portions in the horizontal direction, and the second vertical portion is positioned in a central portion of each of the second head portions in the horizontal direction.

7. The electronic component of claim 5, wherein $0.2 \leq Am/At \leq 0.9$ is satisfied, where an area of the first or second head portion of the first or second external electrode is defined as "At", and an area of the first or second vertical portion is defined as "Am".

8. The electronic component of claim 1, wherein the capacitor array includes a plurality of capacitor arrays stacked in two or more layers in the vertical direction.

9. The electronic component of claim 8, wherein the first and second external electrodes respectively include first and second head portions disposed on both end surfaces of the body in the length direction.

10. The electronic component of claim 9, wherein the first vertical portion extends up to the first head portion of the capacitor array disposed in an upper layer of the two or more layers, and the second vertical portion extends up to the second head portion of the capacitor array disposed in the upper layer of the two or more layers.

11. The electronic component of claim 10, wherein, in the capacitor array disposed in the upper layer, a conductive adhesive portion is disposed between the first head portion and the first vertical portion, and a conductive adhesive portion is disposed between the second head portion and the second vertical portion.

12. The electronic component of claim 8, further comprising:

an encapsulation portion encapsulating the plurality of the capacitor arrays, wherein the first and second horizontal mounting portions are externally exposed from the encapsulation portion.

13. The electronic component of claim 1, wherein the capacitor array has multiple layers and multiple columns.

14. An electronic component comprising:

a capacitor array including a plurality of multilayer capacitors which are sequentially arranged in a first direction; wherein each of the plurality of multilayer capacitors comprises: a body, and first and second external electrodes respectively disposed on opposing surfaces of the body in a length direction of the body, which is orthogonal to the first direction; and a pair of metal frames disposed on both side surfaces of the capacitor array and respectively connected to the first and second external electrodes of each of the plurality of multilayer capacitors, wherein the pair of metal frames includes:

first and second vertical portions respectively bonded to the first and second external electrodes;

first and second horizontal bonding portions respectively extending in the length direction from upper ends of the first and second vertical portions; and first and second horizontal mounting portions respectively extending in the length direction from lower ends of the first and second vertical portions and spaced apart from the capacitor array, wherein the first and second vertical portions and the first and second horizontal mounting portions each include at least one cutout portion in the horizontal direction, such that the first and second vertical portions and the first and second horizontal mounting portions are divided into multiple pieces having a predetermined gap therebetween, wherein the at least one cutout portion of the first and second horizontal mounting portions respectively extends to inner ends of the pair of metal frames in the length direction, wherein the first and second vertical portions and the first and second horizontal mounting portions are provided in plural, and wherein a width of a space between consecutive vertical portions of the plurality of first and second vertical portions is substantially the same as a width of a space between consecutive horizontal mounting portions of the plurality of first and second horizontal mounting portions.

15. The electronic component of claim 14, wherein a conductive adhesive portion is disposed between the first external electrode and the first horizontal bonding portion and between the first external electrode and the first vertical portion, and a conductive adhesive portion is disposed between the second external electrode and the second horizontal bonding portion and between the second external electrode and the second vertical portion.

16. The electronic component of claim 14, wherein further comprising:

an encapsulation portion encapsulating the capacitor array, wherein the first and second horizontal mounting portions are externally exposed from the encapsulation portion.

17. The electronic component of claim 14, wherein the first and second external electrodes respectively include first and second head portions disposed on the opposing surfaces of the body in the length direction, and first and second band portions extending in the length direction from the first and second head portions to portions of upper and lower surfaces of the body.

18. The electronic component of claim 17, wherein the first vertical portion is positioned in a central portion of each of the first head portions in the horizontal direction, and the second vertical portion is positioned in a central portion of each of the second head portions in the horizontal direction.

19. The electronic component of claim 18, wherein $0.2 \leq Am/At \leq 0.9$ is satisfied, where an area of the first or second head portion of the first or second external electrode is defined as "At", and an area of the first or second vertical portion is defined as "Am".

* * * * *